J. J. SMITH.
Sulky-Harrows.

No. 196,393.   Patented Oct. 23, 1877.

WITNESSES:

INVENTOR:
J. J. Smith
BY
ATTORNEYS.

UNITED STATES PATENT OFFICE.

JOHN J. SMITH, OF UNIONVILLE, MISSOURI.

IMPROVEMENT IN SULKY-HARROWS.

Specification forming part of Letters Patent No. 196,393, dated October 23, 1877; application filed August 11, 1877.

*To all whom it may concern:*

Figure 1:
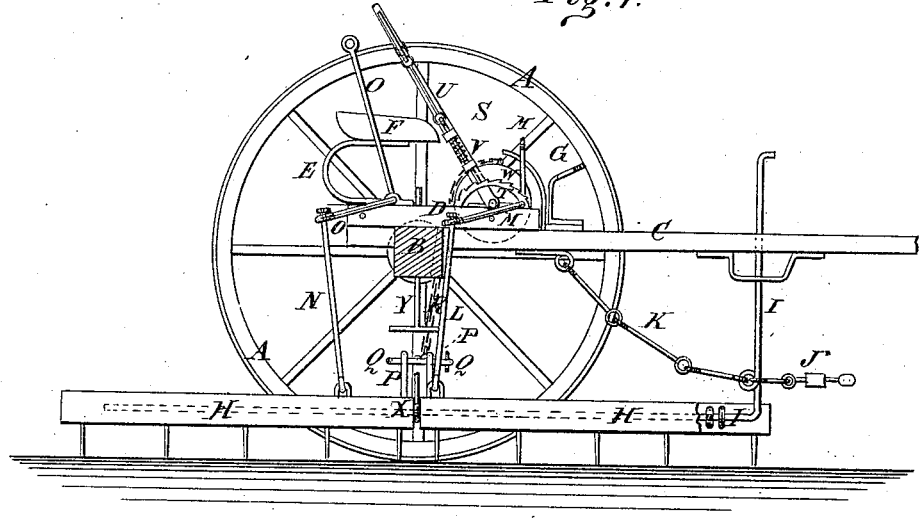
Figure 2:
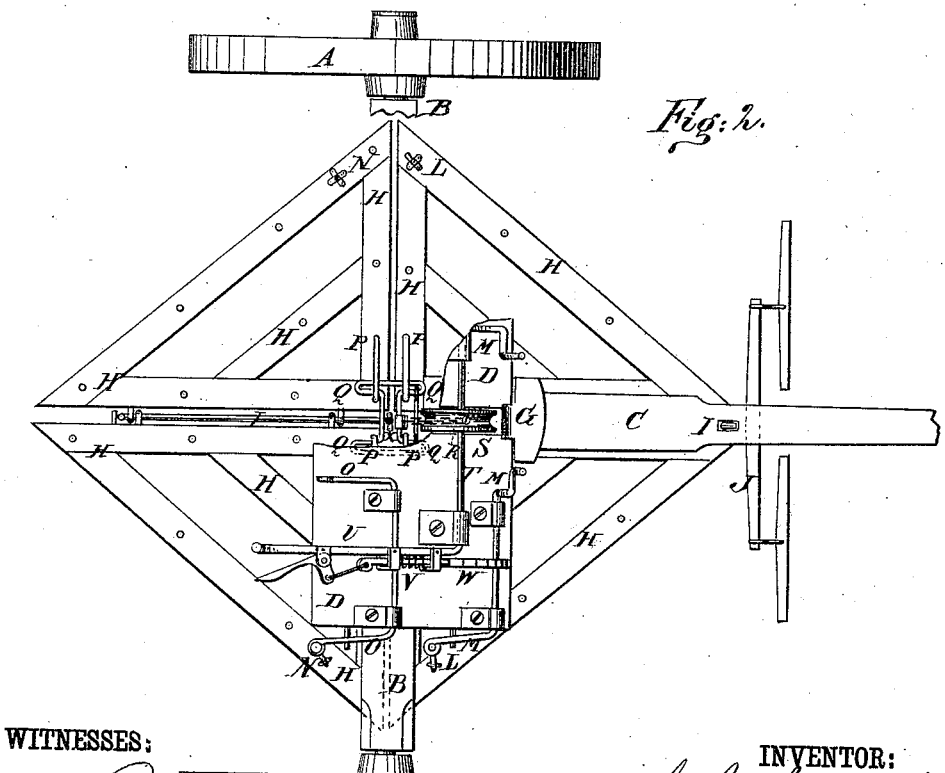

Be it known that I, JOHN J. SMITH, of Unionville, in the county of Putnam and State of Missouri, have invented a new and useful Improvement in Sulky-Harrow, of which the following is a specification:

Figure 1 is a side view of my improved harrow, partly in section, to show the construction. Fig. 2 is a top view of the same, part being broken away to show the construction.

Similar letters of reference indicate corresponding parts.

The object of this invention is to furnish an improved harrow which shall be so constructed that it will adapt itself to the surface of the ground, however uneven said surface may be; that either part may be raised independent of the other part to pass over obstructions and to clear it of rubbish; that all its parts may be raised from the ground at the same time, for convenience in passing from place to place, and which shall be simple in construction and easily operated and controlled.

The invention will first be described in connection with the drawing, and then pointed out in the claim.

A are the wheels, which revolve upon the journals of the axle B. C is the tongue, the rear end of which is rigidly attached to the center of the axle B. To the axle B and to the rear part of the tongue C is attached the platform D, to which are pivoted the various levers, and to which is attached the lower end of the standard E of the driver's seat F, and the board G, for the driver to rest his feet upon.

H is the harrow-frame, which is made in the form of four right-angled triangles, arranged with their right angles in the center, and each having a bar parallel with its hypotenuse. The harrow-frame is placed beneath the axle B, with an angle forward. The side bars of the harrow-frame H, that are in line with the line of draft, are hinged to each other by a rod, I, which passes through eyes or staples attached to the adjacent bars of said parts, so that the outer angle of each of the said four parts may be raised to pass an obstruction or to clear it of rubbish without disturbing the other parts.

The forward part of the rod I is bent upward at right angles and passes through a guide-hole in the tongue C, so as to keep the harrow in proper position beneath the sulky, and cause it to move up and down vertically.

In the lower part of the upright part of the rod I is formed an eye, with which the doubletree J is connected, and with which is also connected the forward end of a chain, K. The rear end of the chain K is connected with the tongue C a little in front of the axle B, and which is the draft-chain of the sulky.

To the outer corner of each forward part of the harrow-frame H is pivoted the lower end of a rod, L, the upper end of which is pivoted to the outer arm of the crank-lever M.

The middle parts or shafts of the crank-levers M work in bearings attached to the platform D, and their inner arms project upward into such positions that they can be conveniently reached and operated by the driver with his feet to raise the said outer corners of the forward parts of the harrow from the ground.

To the outer corner of each rear part of the harrow-frame H is pivoted the lower end of a rod, N, the upper end of which is pivoted to the outer arm of the crank-lever O. The middle part or shaft of the crank-levers O works in bearings attached to the platform D, and their inner arms project upward into such positions that they can be conveniently reached and operated by the driver with his hands, to raise the said outer corners of the rear parts of the harrow-frame from the ground.

To the inner corners of the four parts H of harrow-frame are attached keepers P, through which are passed the arms of a double T-bar, Q.

To the middle part of the double T-bar Q is attached the lower end of a chain, R, which passes over and is attached to a pulley, S, attached to a shaft, T. The shaft T works in bearings attached to the platform D, and upon one of its ends is formed, or to it is attached, a lever, U, so that by operating the lever U the chain R will be wound upon the pulley S, and all the parts of the harrow-frame will be raised from the ground, or adjusted to cause the harrow-teeth to work at any desired depth in the ground.

To the lever U is attached a lever spring-pawl, V, which engages with the notches of a curved bar, W, along which the lever U moves, and the ends of which are attached to the platform D.

To the rod I, in the space between the inner angles of the four parts of the frame H, is attached a rod, X, which passes up through a guide-hole in the axle B and platform D, to cause the harrow to move vertically when being raised and lowered.

To the axle B are attached rods Y, which have cross-heads attached to or formed upon their lower ends for the keepers P to strike against when the harrow-frame is raised, to prevent the said harrow-frame from swinging about when being drawn from place to place.

Having thus described my invention, I claim as new and desire to secure by Letters Patent—

The combination of the four keepers P, the double T-bar or frame Q, the chain R, the pulley S, and the lever U with the inner angles of the parts of the harrow-frame H, and with the frame-work of the carriage, substantially as herein shown and described.

JOHN JACOB SMITH.

Witnesses:
   J. WAGGONER,
   LOUIS SILVEREISON.